United States Patent [19]

Bjornlie et al.

[11] Patent Number: 4,765,816
[45] Date of Patent: Aug. 23, 1988

[54] METHOD AND APPARATUS FOR MAKING OPTICAL FIBER COUPLERS

[75] Inventors: Harvey C. Bjornlie, Pacific Palisades; Timothy E. Clark, Santa Ana, both of Calif.

[73] Assignee: McDonnell Douglas Corporation, Long Beach, Calif.

[21] Appl. No.: 113,038

[22] Filed: Oct. 23, 1987

[51] Int. Cl.$^4$ .............................................. C03B 29/00
[52] U.S. Cl. ............................................ 65/4.2; 65/2; 65/3.11; 65/11.1
[58] Field of Search ................... 65/2, 3.11, 3.12, 4.2, 65/11.1

[56] References Cited

U.S. PATENT DOCUMENTS

| | | | |
|---|---|---|---|
| 4,081,258 | 3/1978 | Goell et al. | 65/2 |
| 4,102,661 | 7/1978 | Dudderar et al. | 65/2 |
| 4,236,904 | 12/1980 | Lazay | 65/2 |
| 4,345,930 | 8/1982 | Basola et al. | 65/2 X |
| 4,548,630 | 10/1985 | Biedka et al. | 65/4.2 X |
| 4,557,557 | 12/1985 | Gleason et al. | 65/4.2 X |
| 4,622,055 | 11/1986 | Mathyssek et al. | 65/2 |

Primary Examiner—Robert L. Lindsay
Attorney, Agent, or Firm—Benjamin Hudson, Jr.; George W. Finch; John P. Scholl

[57] ABSTRACT

There is provided by this disclosure a method and apparatus for making fiber optic couplers that is comprised generally of the steps of stretching a fused optical fiber pair at a predetermined rate to produce first a tapered section, second a constant diameter cylindrical section, and third a final tapered section. The two optical fibers are placed in juxtaposition under a predetermined load, heated to a predetermined temperature until they fuse together to form a single entity having a predetermined width, length and circular cross section. The two moveable platforms apply a predetermined tensile load to the fibers and move the fibers past a heat source in a controlled manner to form the different sections.

8 Claims, 4 Drawing Sheets

METHOD AND APPARATUS FOR MAKING OPTICAL FIBER COUPLERS

BACKGROUND OF THE INVENTION

1. Field of the Invention

This invention relates generally to a method and apparatus for making fiber optic couplers, and tapered ends to optical fibers and more particularly to a method apparatus for making fiber optic couplers having a cylindrical constant diameter midsection.

2. Brief Description of the Prior Art

The need for fiber optic devices such as couplers, tapered polarizers, and others that require the fusing or stretching of optical fibers is common to all applications of fiber optic technology in the communications and sensor fields. In the production of low-loss optical couplers, special attention must be paid to the manufacturing process to insure that couplers can be made with acceptably insertion losses. Many methods of fabricating low-loss couplers have been proposed wherein a biconical taper fiber is utilized in the design of optical waveguides.

There is an ongoing effort to provide couplers that have low insertion losses and a method of manufacturing these waveguides that improves the overall uniformity of the couplers yielded. It is also desirable to provide a method of manufacturing optical waveguides where the coupling ratio may be varied to predetermined specifications.

Generally in the manufacture of optical waveguides, such as couplers, the optical fibers are secured in apparatus in a predetermined position, a heat source is then applied to fuse the fibers together, and a pulling or tensioning means is applied to place the fibers under a predetermined tensile load to draw the fibers to obtain the operating characteristics desired. This manufacturing process is difficult to control in a precise manner because of problems in alignment, controlling temperature and diameter reduction, and minimizing the high losses in coupling or transferring the optical signal from one fiber to another. It would be desirable if there were provided a method and apparatus that could manufacture fiber optic couplers that minimize some of these errors and produce a coupler having low insertion losses and highly predictable coupling ratios.

SUMMARY OF THE INVENTION

There is provided by this invention a method and apparatus for making fiber optic couplers that is comprised generally of the steps of placing two optical fibers in juxtaposition under a predetermined load, heating the fibers to a predetermined temperature until they fuse together to form a single entity having a predetermined width, length and circular cross section. The fibers are stretched at a predetermined rate to produce first a tapered section, second a constant diameter cylindrical section, and third a final tapered section.

These and other features and the advantages of this invention will become apparent from the detailed discussion given below.

BRIEF DESCRIPTION OF THE PREFERRED EMBODIMENT

Figure 1:
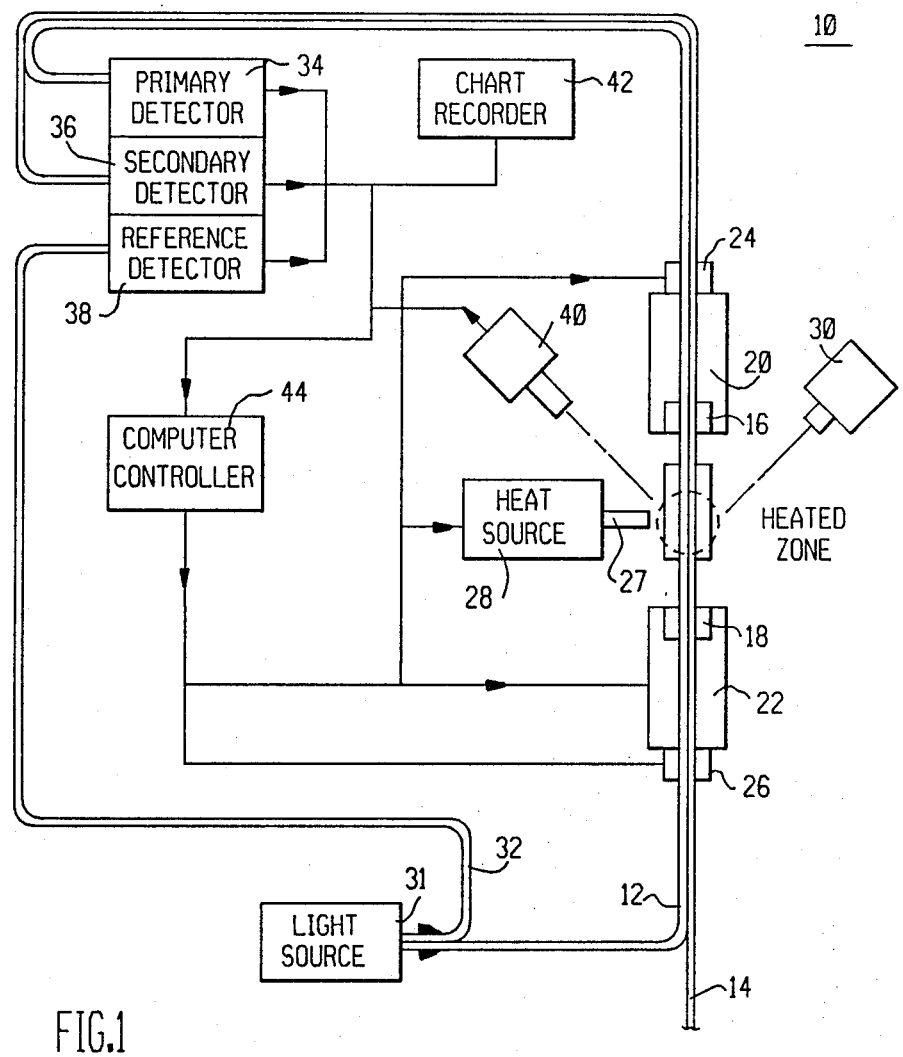
FIG. 1 illustrates the manufacturing apparatus incorporating the principles of this invention.

Referring to FIG. 1, there is shown apparatus 10 for making optical fiber cylindrical couplers in accordance with the principles of this invention. The apparatus comprises two v-groove-type positioning fixtures 16 and 18 that supports two optical fibers 12 and 14. The fixtures 16 and 18 are configured to orient and position the optical fibers in a juxtaposition to facilitate fusing in a manner hereinafter described. Each of the fixtures 16 and 18 are attached to one of two movable platforms 20 and 22 that are driven by-servomotors 24 and 26 along a common axis.

The two platforms 20 and 22 are controlled so that they move in the same plane and in the same directions but at varying speeds. The moveable platforms 20 and 22 are provided to apply a predetermined tensile load to the fibers and move the fibers past a heat source 27. The heat source 27 which may be a torch or other controllable heating means is movably mounted on a platform 28 to control heating of the fibers 12 and 14. This platform 28 may be driven by a servomotor or manually adjusted by a micrometer-type attachment. When the heat source is a torch, appropriate metering is provided for fuel oxygen flow, such as, oxygen and propane flow meters. A zoom microscope 30 with a graduated reticle is used to observe the fibers in the heated zone and to measure their width and length during fusing and stretching.

A light source 31 supplies an input to the optical fiber 12 and a reference input to optical fiber 32. The optical fibers 12, 14 and 32 are connected to detectors 34, 36 and 38 completing an optical circuit. This circuit is used to continuously monitor the manufacturing process and measure insertion loss and the instantaneous coupling ratio between the fibers 12 and 14.

Temperature monitoring apparatus 40 monitors the temperature of the fibers 12 and 14 during the fusing and stretching processes. This apparatus may be a spectrometer, pyrometer, microscope for visual monitoring, or other means for determining the temperature of the fibers.

The plotting recorder 42 records the light intensity received at the detectors 34, 36 and 38. and the fiber temperature from monitor 40. A Computer controller 44 allows the process of manufacturing fiber optic couplers to be preprogrammed. It uses the output of detectors 34, 36, and 38 to control a set of programmed command sequences which in turn control the motions of the movable platforms 20, 22 and 28.

Figure 2:
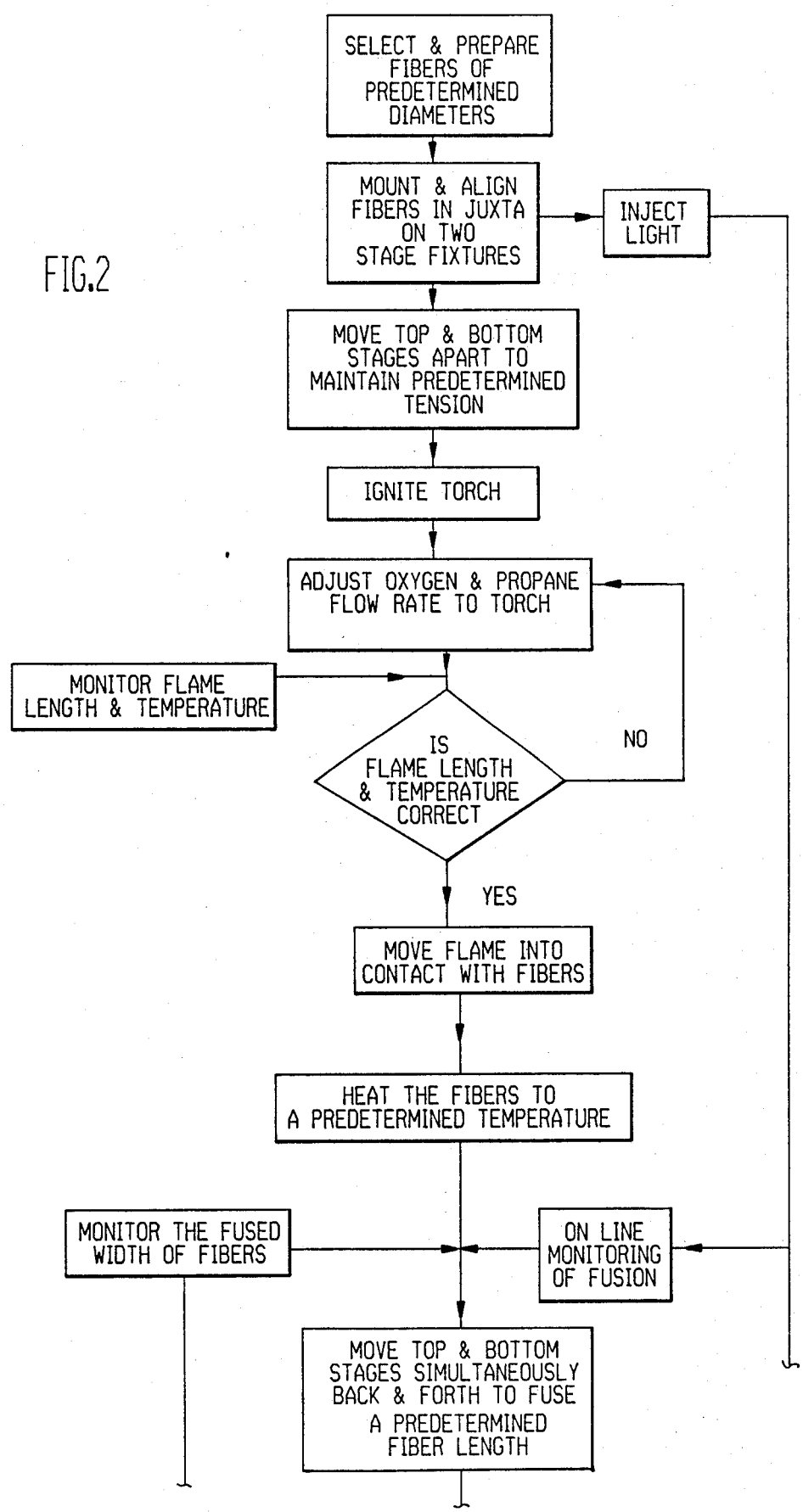
FIGS. 2-4 illustrates a flow chart of the method incorporating the principles of this invention.
Figure 3:
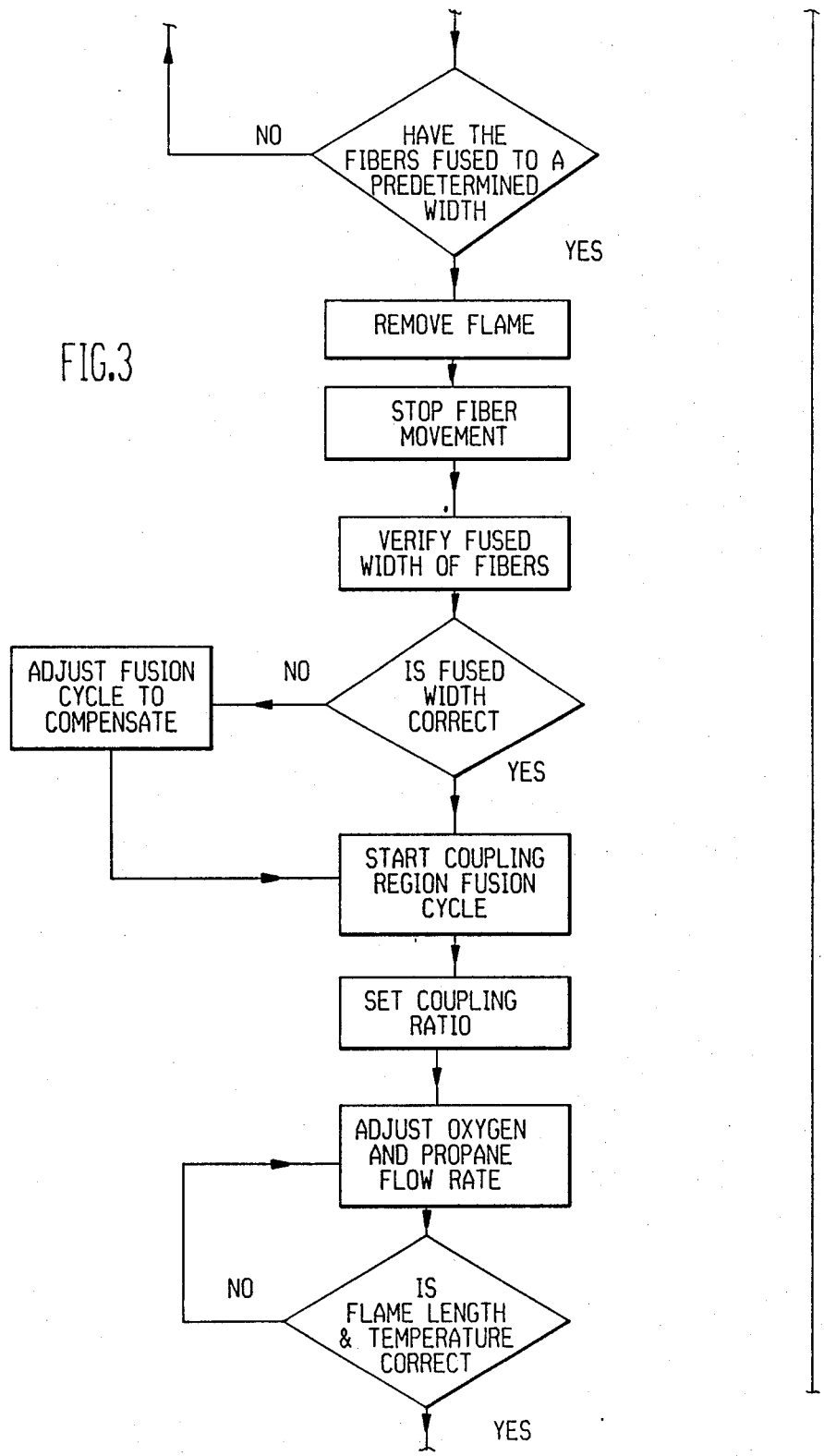
Figure 4:
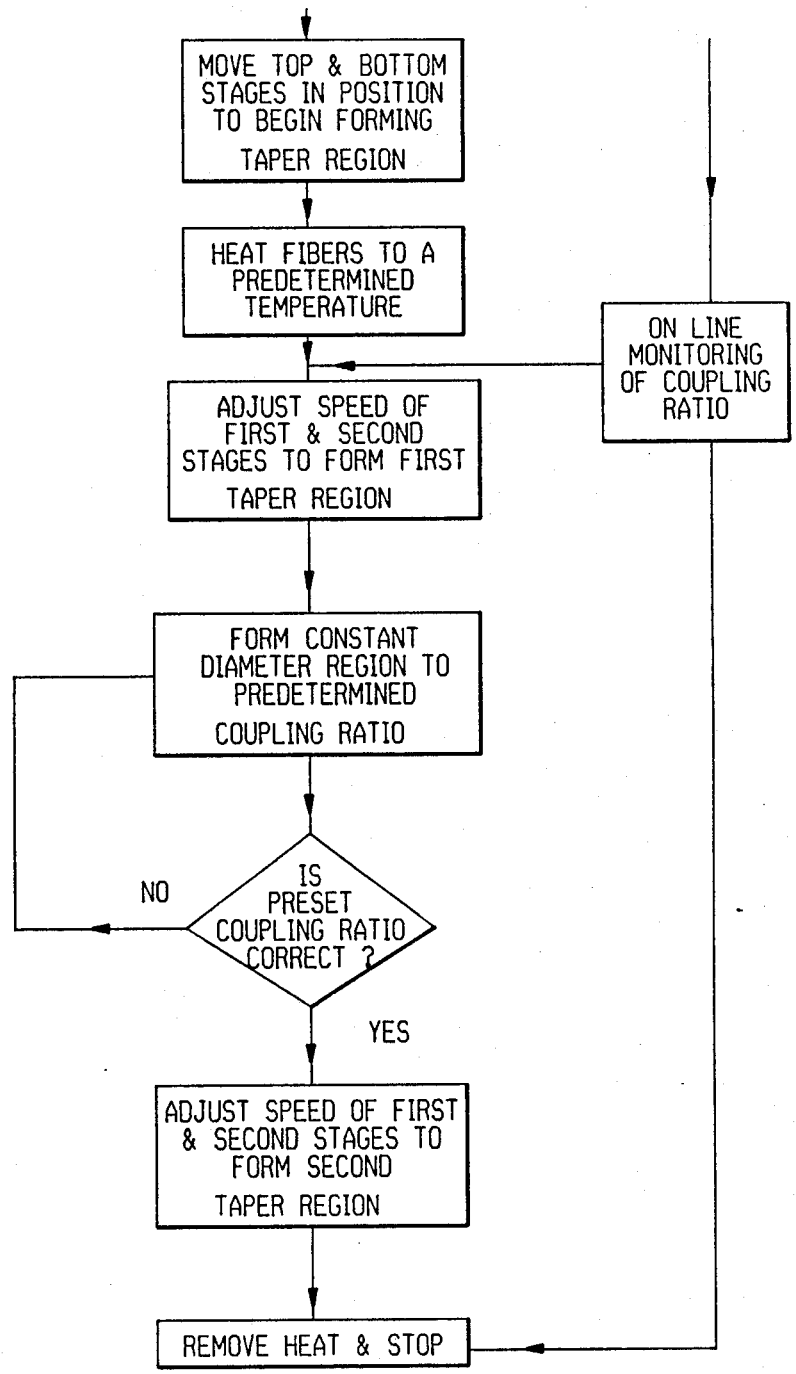

The flow chart shown in FIG. 2 depicts the process of manufacturing a coupler using the apparatus described above wherein a gas torch is used as the heat source. A more detailed description of the method is provided below.

Two lengths of jacketed fiber approximately 6 feet long are prepared by removing short segments of jacket fibers at the ends and midsections. The ends are then precision cleaved. Place both fibers in position on the v-groove fixtures with appropriate clamps or keeper bars not shown. Insure that both fibers lie in the v-grooves of the fixture so that the stripped sections of the fibers are precisely adjacent to each other and are centered by the holders or clamps. The fibers should be in intimate contact over their entire exposed length.

Open the valves on the oxygen and propane lines. Ignite the torch.

Adjust the oxygen and propane flow meters to form a blue flame envelope of approximately 1 to 3 mm in length. The shape of the flame should be cylindrical with a spherical end approximately 1 to 3 mm in diameter. This flame shape and size can be obtained with a torch tip having an inner diameter of approximately 0.5 to 0.75 mm. Bring the flame into contact with the bared portion of the fibers. When the fibers reach their fusing temperature the forward motion of the heat source and the controller 44 signals the two movable platforms to move the fibers back and forth through the flame at predetermined speeds.

With the microscope 30 maximum at magnification, measure the combined width of the two fibers 12 and 14 in the fused region. An alternate method of measuring the width of the fibers in the fused region would be to use a laser measuring system that could also sequence the controller 44 when a predetermined width is reached. The required width is specified for each fiber type. At this stage the fibers will be melted together such that their claddings have fused together forming a common circular cross section rather than two circles joined at a common boundary. The detector outputs 34, 36, and 38 are monitored to determine insertion loss. To prevent any further size reduction, fusing must be stopped at this point by removing the heat source.

In preparation for the stretching sequence, the fibers are positioned so as to place one end of the fused section near the heat source 27.

When the fused section of the fibers have moved to their highest position with respect to the heat source 27, move the heat source inwardly until the fusion temperature of fiber cladding are reached At this time, the platforms begin a preprogrammed movement to form the coupler sections. The controller is programmed to automatically form a taper, a reduced constant diameter section, and a final taper. As shown in FIG. 1, the two platforms are placed on the same axis. To form a taper, it is necessary to operate these two platforms simultaneously at rates which vary with time. At the beginning of the taper, both platforms must travel at the same rate in the same direction. At this instant the ratio of the platform speeds is 1.0. To form the taper, the rate of the upper platform must gradually decrease while the lower platform rate oncreases correspondingly.

The two platforms are moved in varying speeds according to the equation $$S_1/S_2 = 1 + (wt)$$

where $S_1$ is the speed of the leading or drawing platform through the heat source, $S_2$ is the speed of the following platform, $w$ is a constant, and $t$ is the time. The taper is complete when this ratio is equal to the square of the ratio of the original fiber diameter $d_0$ to the reduced fiber diameter, $D_1$ i.e, $$S_1 S_2 = D_o^2/D_1^2$$

The speeds of the two platforms become constant at this point to form a preprogrammed cylindrical midsection. The formation of this section continues until a preset coupling ratio is reached.

To form the expanding taper section after completion of the cylindrical midsection, the relative speed of the leading or drawing platform through the heat source 27 is reduced gradually as the fibers are pulled through the heat source until platforms speeds are equal. The platforms speeds during this process conform to the equation $$S_1/S_2 = D_o^2/D_1 - \tan(wt)$$

where t is reset to 0 at the beginning of this taper. The process stops when the ratio of the speeds reaches a value of 1.0.

This process for forming tapers may also be used to form a tapered section on a single optical fiber. Instead of two fibers, a single fiber can be placed in the apparatus whereby the fusing steps are eliminated and only the stretching steps are implemented. After the tapered section is formed the optical fiber is then cleaved to form optical fibers with tapered ends. Individual fibers with tapered ends have a variety of applications in optical circuits.

Although there has been illustrated and described specific detail and structure of operation, it is clearly understood the same were merely for purposes of illustration and that changes and modifications may be readily made therein by those skilled in the art without departing from the spirit and the scope of this invention.

What we claim is:

1. A method of making fiber optic couplers, comprising:
   (a) mounting and aligning two optical fibers in juxtaposition on two movable platforms at a predetermined tension;
   (b) injecting a light signal input to the optical fibers and connecting output detectors to the optical fibers establishing an optical circuit for monitoring the manufacturing process to establish a predetermined coupling ratio;
   (c) heating the fibers until they are fused to a predetermined width, length and generally circular cross section;
   (d) moving the two platforms in the same direction but at different speeds to stretch the optical fibers to form a coupler having a reducing tapered end, expanding tapered end and a constant diameter cylindrical midsection.

2. A method of making fiber optical couplers is recited in claim 1 wherein the reducing tapered end is formed by controlling speeds $S_1$ and $S_2$ of the two movable platforms according to the equation:

$$S_1/S_2 = 1 + \tan(wt)$$

3. A method of making fiber optic couplers as recited in claim 2 wherein the constant diameter midsection is formed by controlling the speeds $S_1$ and $S_2$ of the two movable platforms to create a reduced diameter $d_1$ of the fibers from the original diameter $d_o$ according to the equation:

$$S_1/S_2 = D_o^2/D_1^2$$

4. A method of making fiber optic couplers as recited in claim 3 wherein the expanding tapered end is formed by controlling the speeds $S_1$ and $S_2$ of the two movable platforms according to the equation $$S_1 S_2 = D_o^2/D_1^2 - \tan(wt).$$

5. A method of making an optical fiber having a tapered end, comprising:

(a) mounting and aligning an optical fiber on two movable platforms at a predetermined position;

(b) injecting a light signal input to the optical fiber and connecting an output detector to the optical fiber for monitoring the taper forming process;

(c) Heating the optical fibers until the melting temperature is generally reached;

(d) moving the platforms in the same direction but at different speeds to form first a reducing tapered section and second an expanding tapered section; and (e) cleaving the optical fiber between the reducing tapered section and the expanding tapered section to form optical fibers having tapered ends.

6. A method of making tapers in optical fibers as recited in claim 5 wherein the reducing taper is formed by controlling the speeds $S_1$ and $S_2$ of the two movable platforms according to the equation $$S_1/S_2 = 1 + \tan(wt).$$

7. A method of making tapers in optical fibers as recited in claim 5 wherein the expanding tapered is formed by controlling the speeds $S_1$ and $S_2$ of the two movable platforms according to the equation:

$$S_1 S_2 = D_o^2/D_1^2 - \tan(wt).$$

8. Apparatus for making fiber optic couplers, comprising:

(a) mounting means for mounting at least two optical fibers for fusing on two movable platforms;

(b) heating means for heating the fibers to a predetermined temperature;

(c) programmable control means connected to the movable platforms and the heating means for controlling the heating means and the movable platforms for fusing and stretching the fibers to predetermined dimensions;

(d) measuring means and temperature monitoring means in close proximity to the optical fibers for measuring temperature and dimensions of the optical fibers in the region of heating and stretching; and (e) optical circuit means for inputting a light signal to the optical fibers and detecting the output of the fibers connected to the programmable control means to establish a predetermined coupling ratio of the optical fibers during the fusing and stretching of the fibers to predetermined dimensions.

* * * * *